United States Patent
Itamoto et al.

(10) Patent No.: US 9,296,415 B2
(45) Date of Patent: Mar. 29, 2016

(54) ELECTRONIC POWER STEERING APPARATUS

(75) Inventors: Hidenori Itamoto, Tajimi (JP); Hirozumi Eki, Okazaki (JP); Gempei Nakasone, Nisshin (JP)

(73) Assignee: JTEKT CORPORATION, Osaka-shi (JP)

( * ) Notice: Subject to any disclaimer, the term of this patent is extended or adjusted under 35 U.S.C. 154(b) by 189 days.

(21) Appl. No.: 14/119,655

(22) PCT Filed: Jun. 12, 2012

(86) PCT No.: PCT/JP2012/064961
§ 371 (c)(1),
(2), (4) Date: Nov. 22, 2013

(87) PCT Pub. No.: WO2012/173102
PCT Pub. Date: Dec. 20, 2012

(65) Prior Publication Data
US 2014/0081525 A1 Mar. 20, 2014

(30) Foreign Application Priority Data
Jun. 15, 2011 (JP) ................. 2011-132800

(51) Int. Cl.
*B62D 6/00* (2006.01)
*B62D 5/04* (2006.01)

(52) U.S. Cl.
CPC .............. *B62D 5/0463* (2013.01); *B62D 5/049* (2013.01); *B62D 5/0484* (2013.01)

(58) Field of Classification Search
None
See application file for complete search history.

(56) References Cited

U.S. PATENT DOCUMENTS

| 6,360,151 | B1 | 3/2002 | Suzuki et al. | |
|---|---|---|---|---|
| 7,708,109 | B2* | 5/2010 | Suzuki et al. | 180/446 |
| 8,219,277 | B2* | 7/2012 | Ura | 701/29.7 |
| 9,065,375 | B2* | 6/2015 | Yanai | |
| 2002/0189371 | A1 | 12/2002 | Nakane et al. | |
| 2005/0205344 | A1 | 9/2005 | Uryu | |
| 2009/0319117 | A1 | 12/2009 | Nakane | |
| 2010/0082200 | A1* | 4/2010 | Ura | 701/34 |
| 2010/0235049 | A1* | 9/2010 | Kariatsumari et al. | 701/41 |

FOREIGN PATENT DOCUMENTS

| CN | 1151046 C | 5/2004 |
|---|---|---|
| CN | 1509926 A | 7/2004 |
| EP | 2364897 A2 | 9/2011 |
| JP | A 2000-185657 | 7/2000 |
| JP | A 2003-149062 | 5/2003 |

(Continued)

OTHER PUBLICATIONS

Sep. 11, 2012 International Search Report issued in International Patent Application No. PCT/JP2012/064961.

(Continued)

*Primary Examiner* — Redhwan K Mawari
*Assistant Examiner* — Edward Torchinsky
(74) *Attorney, Agent, or Firm* — Oliff PLC

(57) ABSTRACT

When only one of sensor signals generated by the plural systems and output from a torque sensor is normal, a control variable restriction processing part performs an assist restricting process for setting an upper limit value and a lower limit value of a basic assist control variable in accordance with at least one of the lateral acceleration, the steering angle, the steering speed, or the yaw rate.

4 Claims, 6 Drawing Sheets

(56) References Cited

FOREIGN PATENT DOCUMENTS

| | | |
|---|---|---|
| JP | A 2003-312507 | 11/2003 |
| JP | A 2004-224077 | 8/2004 |
| JP | 2004-276697 A | 10/2004 |
| JP | A 2004-338562 | 12/2004 |
| JP | A 2005-225340 | 8/2005 |
| JP | A 2006-248354 | 9/2006 |
| JP | A 2008-284889 | 11/2008 |
| JP | A 2010-876 | 1/2010 |
| JP | A 2011-105271 | 6/2011 |

OTHER PUBLICATIONS

Feb. 4, 2015 Search Report issued in European Patent Application No. 12800405.8.

Jun. 11, 2015 Office Action issued in Chinese Patent Application No. 201280028268.5.

\* cited by examiner

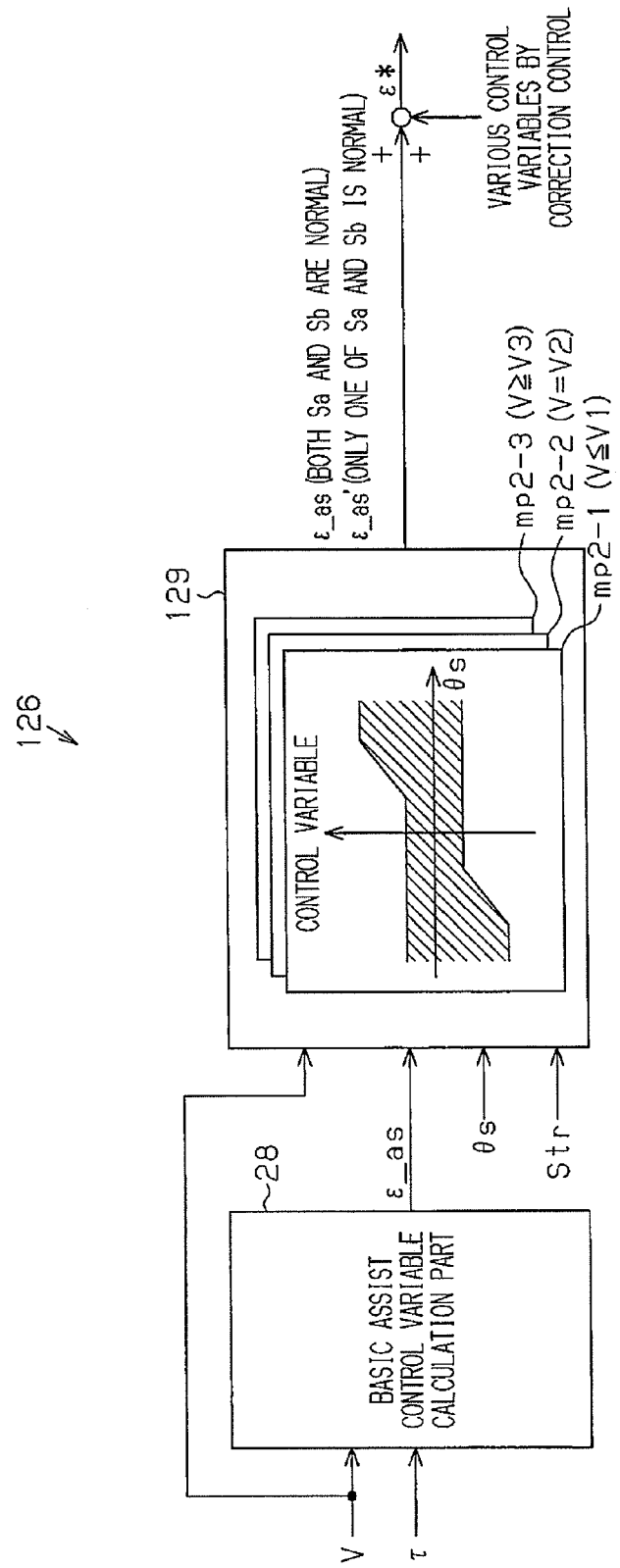

ELECTRONIC POWER STEERING APPARATUS

FIELD OF THE INVENTION

The present invention relates to an electronic power steering apparatus.

BACKGROUND OF THE INVENTION

In general, electronic power steering apparatuses (EPS) are provided with a motor serving as a drive source and a torque sensor. The torque sensor outputs a sensor signal based on torsion of a torsion bar provided in the middle of a steering shaft. Then, in response to a steering torque detected based on a sensor signal sent from the torque sensor, a torque in the motor is controlled so that an appropriate assist force is applied to a steering system in accordance with a steering torque. It is therefore necessary in electronic power steering apparatuses to detect a steering torque in a stable and highly accurate manner so that an appropriate assist force can be obtained.

For example, Patent Document 1 discloses a torque sensor for use in an electronic power steering apparatus for vehicle. The torque sensor disclosed in this document is provided with an input shaft, an output shaft, a torsion bar for connecting the input shaft and the output shaft, a ring-shaped magnet attached to the input shaft, a pair of magnetic yokes placed to surround the magnet, and magnetic sensors for detecting the density of a magnetic flux generated between the paired magnetic yokes. In this configuration, detection accuracy is improved by adding or averaging outputs from the plural magnetic sensors.

Another electronic power steering apparatus provided with a plurality of torque sensors is also disclosed in Patent Document 2. According to the electronic power steering apparatus disclosed in this document, even if an abnormal sensor signal is outputted from one of two torque sensors, an assist force can be applied continuously by using a sensor signal outputted from the remaining normal torque sensor.

Although Patent Document 1 teaches how to improve detection accuracy by increasing the number of magnetic sensors, a backup control is not taken into consideration in the event of an abnormal sensor signal generated by any one of plural systems and outputted from torque sensor. Patent Document 2 teaches, in the event of an abnormal sensor signal outputted from the remaining normal torque sensor, suspending assist provided by an assist device after passing of a predetermined period of time from a sudden change of a value detected by the torque sensors, but it takes no account of measures taken in a period from a sudden change of a detected value to suspension of assist. Thus, it is likely in conventional electronic power steering apparatuses that an assist force is applied to a steering system unintentionally during a period from detecting no normal sensor signal generated by plural systems and outputted from a torque sensor to suspending an assist force provided by a steering force assist device.

PRIOR ART DOCUMENTS

Patent Documents

Patent Document 1: Japanese Unexamined Patent Application Publication No. 2003-149062
Patent Document 2: Japanese Unexamined Patent Application Publication No. 2000-185657

DISCLOSURE OF THE INVENTION

The object of the present invention is to provide an electronic power steering apparatus capable of efficiently suppressing unintentional application of an assist force to a steering system in the event of detecting no normal signal generated by a plurality of systems and outputted from a torque sensor.

In order to solve the above problems, an electronic power steering apparatus according to a first aspect of the present invention is provided with a motor as a drive source, a steering force assist device for applying an assist force to a steering system of a vehicle, a torque sensor for outputting sensor signals generated by a plurality of systems based on torsion of a torsion bar placed in a steering shaft, a vehicle speed sensor for detecting a vehicle speed, a torque calculation means for detecting a steering torque based on sensor signals outputted from the torque sensor, and a control means for controlling the steering force assist device for calculating an assist control variable based on a steering torque and a vehicle speed and for executing an assist control in order to apply, to a steering system, an assist force based on a controlled variable of assist. When only one of the sensor signals generated by the plural systems is normal, the control means executes an assist restriction process for setting an upper limit value and a lower limit value of an assist control variable according to at least any one of the lateral acceleration, steering angle, steering speed and yaw rate.

In this configuration, the control means executes an assist restriction process when only one of the sensor signals generated by the plural systems and outputted from the torque sensor is normal. Therefore, even if there is no normal sensor signal detected due to abnormality of the remaining normal sensor signal, unintentional application of an assist force to the steering system can be suppressed effectively because the magnitude of an assist force applied to the steering system is limited to a predetermined range. In the above electronic power steering apparatus, the control means executes an assist restriction process according to at least any one of the lateral acceleration, steering angle, steering speed and yaw rate. In general, a reaction torque inputted from a road surface to the steering system is correlated with each of the lateral acceleration acting on a vehicle, the steering angle and steering speed of the steering wheel and the yaw rate of the vehicle. More specifically, the larger these values are, the greater the reaction torque becomes. Therefore, a driver requires a larger steering torque in steering as these values increase. In this regard, if an assist restriction process is executed according to a state parameter of at least any one of the lateral acceleration, steering angle, steering speed and yaw rate, an assist force, if needed, can be applied to the steering system by setting an upper limit value and a lower limit value of the assist control variable to correspond to the state parameter.

In the above electronic power steering apparatus, the control means preferably execute an assist restriction process based on a map.

In this configuration, an upper limit value and a lower limit value of the assist control variable can be set easily according to design specifications.

In the above electronic power steering apparatus, the control means preferably executes an assist restriction process when the vehicle speed is higher than or equal to a predetermined speed.

In general, since a sufficiently large assist force is required when the vehicle speed is low, the need for restricting an assist control variable is low. In this regard, owing to an assist restriction process executed in the present invention only when the vehicle speed is higher than or equal to a predetermined speed, an assist force can be applied to the steering system continuously only in a vehicle speed range in which an assist force is required.

In the above power steering device, the control means is preferably provided with a plurality of maps so that the control means selects any one of the plural maps in accordance with a vehicle speed and executes an assist restriction process based on the selected map.

In general, since a sufficiently large assist force is required when the vehicle speed is low, the need for restricting an assist control variable is low. Also, an assist force is preferably applied by imposing higher restriction on an assist control variable when the vehicle speed is high than when it is low. In this regard, the control means in the present invention executes an assist restriction process based on a map selected in accordance with a vehicle speed. Therefore, an assist force of an appropriate magnitude relative to a vehicle speed can be applied to the steering system while restricting the assist control variable.

In the above electronic power steering apparatus, the plurality of maps include a first map that is selected when the vehicle speed is lower than or equal to a first speed, a second map that is selected when the vehicle speed corresponds to a second speed, which is higher than the first speed, and a third map that is selected when the vehicle speed is higher than or equal to a third speed, which is higher than the second speed. When the vehicle speed is higher than the first speed but lower than the second speed, the control means preferably executes an assist restriction process based on an upper limit value and a lower limit value of an assist control variable to be obtained by interpolation of the first map and the second map. When the vehicle speed is higher than the second speed but lower than the third speed, the control means preferably executes an assist restriction process based on an upper limit value and a lower limit value of an assist control variable to be obtained by interpolation of the second map and the third map.

In this configuration, unintentional application of an assist force to the steering system can be suppressed throughout an entire vehicle speed range while appropriately restricting an assist control variable.

In the above electronic power steering apparatus, the control means preferably suspends an assist control while gradually decreasing an assist force when no normal sensor signals generated by the plural systems are detected.

In this configuration, the control means suspends an assist control eventually while gradually decreasing an assist force when there is no normal sensor signal detected. It is therefore possible to prevent a sudden change of an assist force caused by an abnormal sensor signal outputted from the torque sensor. As a result, steering operation can be realized without hindrance.

BRIEF DESCRIPTION OF DRAWINGS

FIG. 6 is a block diagram showing a process to restrict a basic assist control variable according to a second embodiment of the present invention.

DETAILED DESCRIPTION OF THE PREFERRED EMBODIMENTS

First Embodiment

Explained below according to FIG. 1 to FIG. 5 is a first embodiment in which a concrete example of an electronic power steering apparatus (EPS) of the present invention is presented.

Figure 1:
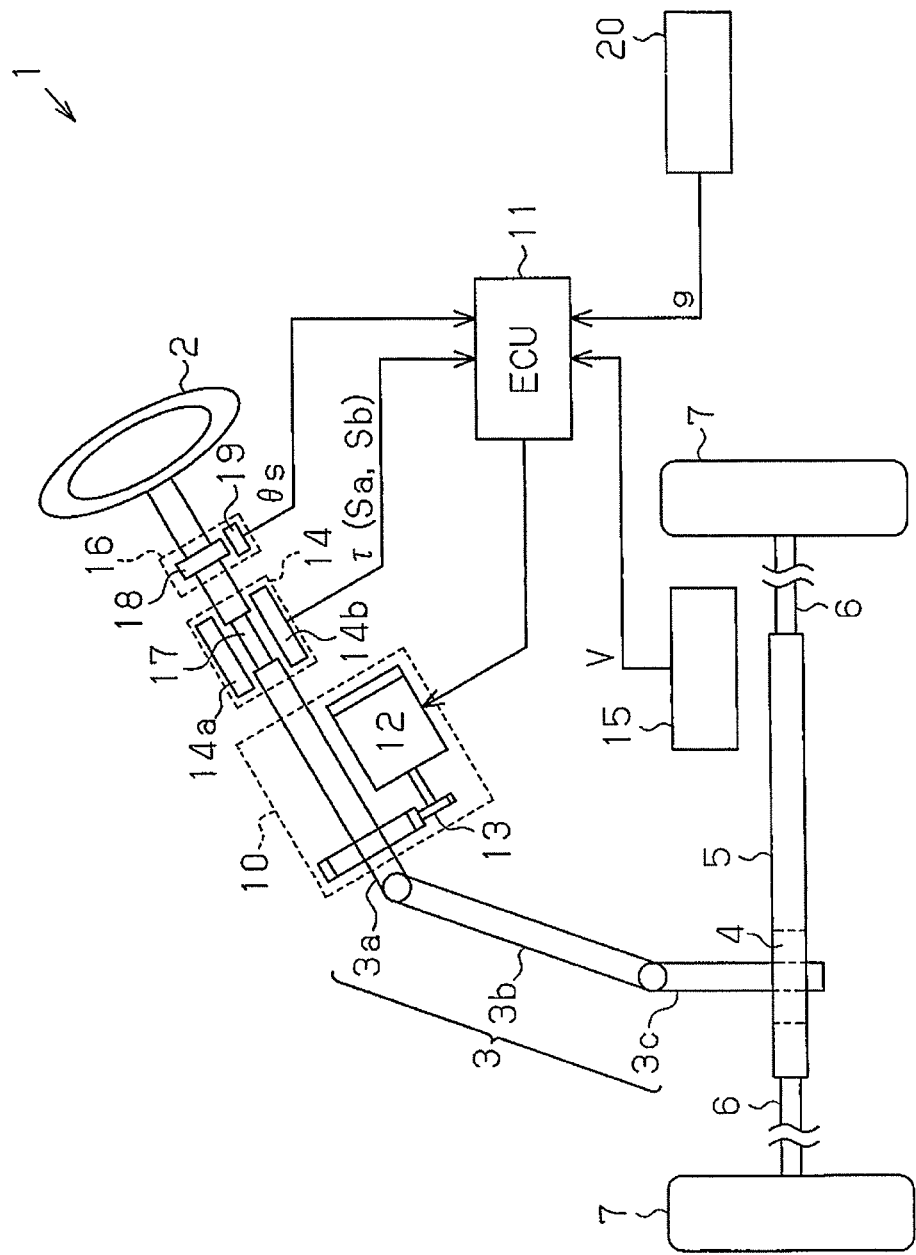
FIG. 1 is a schematic configuration diagram of an electronic power steering apparatus.

As shown in FIG. 1, a steering wheel 2 is continuously fixed to a steering shaft 3 and connected to a rack shaft 5 via a rack-and-pinion mechanism 4. When a driver operates the steering wheel 2, the steering shaft 3 rotates and rotation of the steering shaft 3 is converted into a linear reciprocating motion of the rack shaft 5 via the rack-and-pinion mechanism 4.

The steering shaft 3 is composed of a column shaft $3a$, an intermediate shaft $3b$ and a pinion shaft $3c$ that are connected to each other. A torsion bar 17 is attached to a middle part of the column shaft $3a$. Both ends of the rack shaft 5 are connected to tie rods 6. Linear motion of the rack shaft 5 is transmitted to knuckles not shown via the tie rods 6. The mechanism causes a change in the steering angle of steered wheels 7 so that a vehicle changes its traveling direction.

An electronic power steering apparatus 1 is provided with an EPS actuator 10 serving as a steering force assist device, and an ECU 11 serving as a control means. The EPS actuator 10 applies an assist force to a steering system of a vehicle in order to assist operation of the steering wheel 2 by a driver. The ECU 11 controls activation of the EPS actuator 10.

The EPS actuator 10 is configured as a column-type EPS actuator. The EPS actuator 10 is provided with a motor 12 serving as a drive source and a deceleration mechanism 13 for connecting the motor 12 and the column shaft $3a$. For the motor 12, a DC motor with a brush is adopted. The EPS actuator 10 decelerates rotation of the motor 12 by using the deceleration mechanism 13 and transmits it to the column shaft $3a$. Therefore, a torque of the motor 12 is applied to the steering system as an assist force.

Various kinds of sensors are connected to the ECU 11 in order to detect state parameters of the vehicle. More specifically, sensors connected to the ECU 11 include a torque sensor 14 for detecting a steering torque $\tau$, a vehicle speed sensor 15 for detecting a vehicle speed V, a steering sensor 16 serving as a steering angle sensor for detecting a steering angle $\theta s$, and a lateral acceleration sensor 20 for detecting a lateral acceleration g acting on the vehicle. The ECU 11 detects the steering torque $\tau$, the vehicle speed V, the steering angle $\theta s$ and the lateral acceleration g based on signals outputted from the respective sensors.

The torque sensor 14 outputs sensor signals Sa and Sb generated by a plurality of systems. The torque sensor 14 is provided with a sensor core not shown and two sensor elements $14a$ and $14b$. The sensor core generates a magnetic flux that is variable based on torsion of the torsion bar 17. The sensor elements $14a$ and $14b$, each of which is made of a Hall IC being a magnetic transducer element, are placed to surround the sensor core. When the steering shaft 3 receives a torque and torsion of the torsion bar 17 is detected, a magnetic flux that passes through each of the sensor elements $14a$ and $14b$ shows a change. Output voltages of the sensor elements $14a$ and $14b$ that are subjected to a change in response to a magnetic flux change are outputted from the torque sensor 14 to the ECU 11 as the sensor signals Sa and Sb, respectively. The ECU 11 detects the steering torque τ based on the sensor signals Sa and Sb outputted from the sensor elements 14*a* and 14*b* respectively.

The steering sensor 16 is a rotation angle sensor of a magnetic type. The steering sensor 16 is provided with a rotor 18 fixed to the column shaft 3*a* and a sensor element 19. The sensor element 19 is made of a Hall IC and placed adjacent to the rotor 18. The rotor 18 is placed between the torque sensor 14 and the steering wheel 2. The sensor element 19 detects a magnetic flux change in accordance with rotation of the rotor 18. The ECU 11 detects the steering angle θs based on a sensor signal outputted from the sensor element 19.

The ECU 11 calculates a target assist force based on the steering torque τ and the vehicle speed V detected by the vehicle speed sensor 15. The ECU 11 supplies drive power to the motor 12 in order to cause the EPS actuator 10 to generate a target assist force. The ECU 11 thus executes an assist control for controlling an assist force supplied to the steering system.

Next, an assist control and an assist continuation control in the electronic power steering apparatus 1 is explained with reference to FIG. 2 and FIG. 3.

Figure 2:
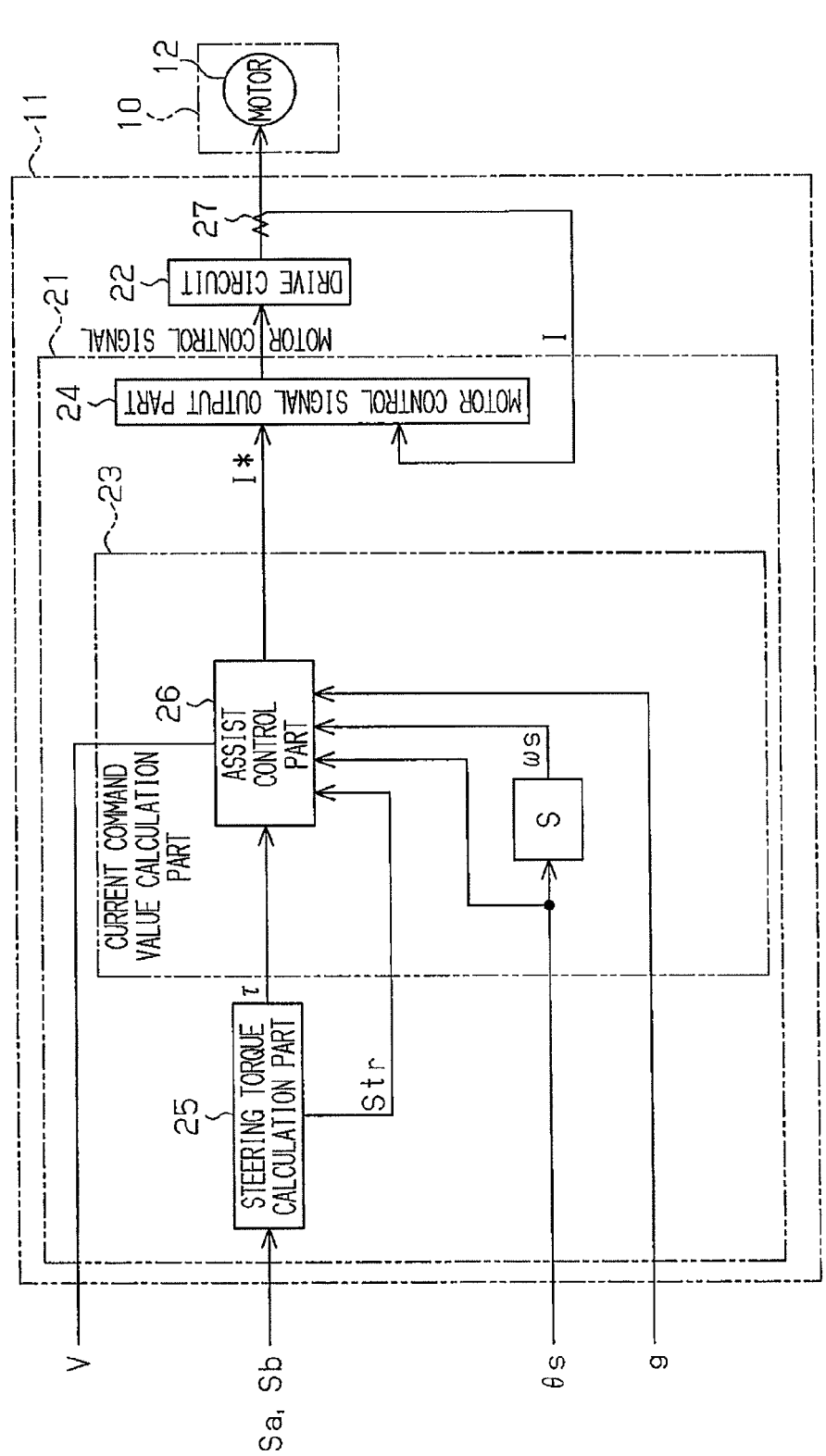
FIG. 2 is a control block diagram of the electronic power steering apparatus.

As shown in FIG. 2, the ECU 11 is provided with a microcomputer (referred to as CPU hereinafter) 21 for outputting a motor control signal, and a drive circuit 22 for supplying drive power to the motor 12 based on the motor control signal. The CPU 21 includes a current command value calculation part 23, a motor control signal output part 24 and a steering torque calculation part 25 serving as a torque calculation means. The current command value calculation part 23 includes an assist control part 26 and a differentiator S for calculating a steering speed ωs by differential processing of the steering angle θs. As shown in FIG. 3, the assist control part 26 includes a basic assist control variable calculation part 28 and a control variable restriction processing part 29.

The steering torque calculation part 25 detects abnormality of the sensor signals Sa and Sb outputted from the torque sensor 14. The steering torque calculation part 25 determines whether or not the torque sensor 14 has a fault based on the presence and absence of abnormality in the sensor signals Sa and Sb. When the sensor signals Sa and Sb are not detected as abnormal by the steering torque calculation part 25, the ECU 11 executes a normal assist control.

For execution of the assist control, the CPU 21 detects each of the steering torque τ, the vehicle speed V, the steering angle θs and the lateral acceleration g by a predetermined sampling period. The steering torque calculation part 25 calculates the steering torque τ based on the sensor signals Sa and Sb outputted from the torque sensor 14. As stated above, the torque sensor 14 is a magnetic torque sensor using a Hall IC. Therefore, the steering torque calculation part 25 carries out a correction process (for temperature property and the like) by using the sensor signals Sa and Sb generated by the two systems in order to calculate the steering torque τ with high accuracy.

The current command value calculation part 23 calculates an assist control variable ε* based on the steering torque τ and the vehicle speed V. More specifically, the steering torque τ, the vehicle speed V and the lateral acceleration g are inputted to the assist control part 26. The assist control part 26 uses the basic assist control variable calculation part 28 to calculate a basic assist control variable ε_as based on the steering torque τ and the vehicle speed V, as shown in FIG. 3. Note that the basic assist control variable ε_as serves as a basic component to generate a target assist force of an appropriate magnitude relative to the steering torque τ.

The assist control part 26 calculates the basic assist control variable ε_as having an absolute value that becomes larger as an absolute value of the steering torque τ increases. That is, the assist control part 26 calculates the basis assist control variable ε_as so that a larger assist force is applied to the steering system as an absolute value of the steering torque τ increases. Calculation of the basic assist control variable ε_as also uses a three-dimensional map that is reactive to a vehicle speed. The assist control part 26 calculates the basic assist control variable ε_as having an absolute value that becomes larger as the vehicle speed V decreases.

As shown in FIG. 2, the current command value calculation part 23 calculates a current command value I* corresponding to a target assist force based on the assist control variable ε* calculated from the basic assist control variable ε_as. The motor control signal output part 24 receives the current command value I* from the current command value calculation part 23 and also receives an actual current value I of the motor 12 to be detected by the current sensor 27. The motor control signal output part 24 executes a current feedback control for causing the current command value I* to follow the actual current value I.

The motor control signal output part 24 generates a motor control signal by making a current feedback control and outputs the motor control signal to the drive circuit 22. When the motor control signal is received, the drive circuit 22 supplies drive power based on the motor control signal to the motor 12. When the motor 12 is driven, the EPS actuator 10 is activated to execute an assist control. The ECU 11 also executes an assist continuation control as a backup control in the event of abnormality of the sensor signals Sa and Sb generated by the plural systems and outputted from the torque sensor 14.

For execution of the assist control, the steering torque calculation part 25 determines that the torque sensor 14 has a fault when at least one of the sensor signals Sa and Sb outputted from the torque sensor 14 is detected as abnormal. The steering torque calculation part 25 also outputs an abnormality detection signal Str, which indicates that the torque sensor 14 has a fault, to the assist control part 26. Abnormality of the sensor signals Sa and Sb is detected by determining whether or not values of the sensor signals Sa and Sb deviate from those allowed at normal time and comparing/determining values of the sensor signals Sa and Sb and variations thereof per unit time, as disclosed in Patent Document 2. Fault of the torque sensor 14 is also detected based on whether or not abnormality of the sensor signals Sa and Sb is continuous for a predetermined period of time.

When only one of the sensor signals Sa and Sb is detected as abnormal by the steering torque calculation part 25, the CPU 21 calculates the steering torque τ based on the remaining normal sensor signal and continues an assist control. In this case, a correction process using the two sensor signals Sa and Sb is not executed but the steering torque calculation part 25 calculates the steering torque τ by using the remaining normal sensor signal and the current command value calculation part 23 continuously calculates and outputs the current command value I* based on the steering torque τ. Therefore, the vehicle speed V and the steering torque τ are inputted to the basic assist control variable calculation part 28. The basic assist control variable calculation part 28 calculates the basic assist control variable ε_as based on the vehicle speed V and the steering torque τ and outputs the basic assist control variable ε_as to the control variable restriction processing part 29.

Figure 3:
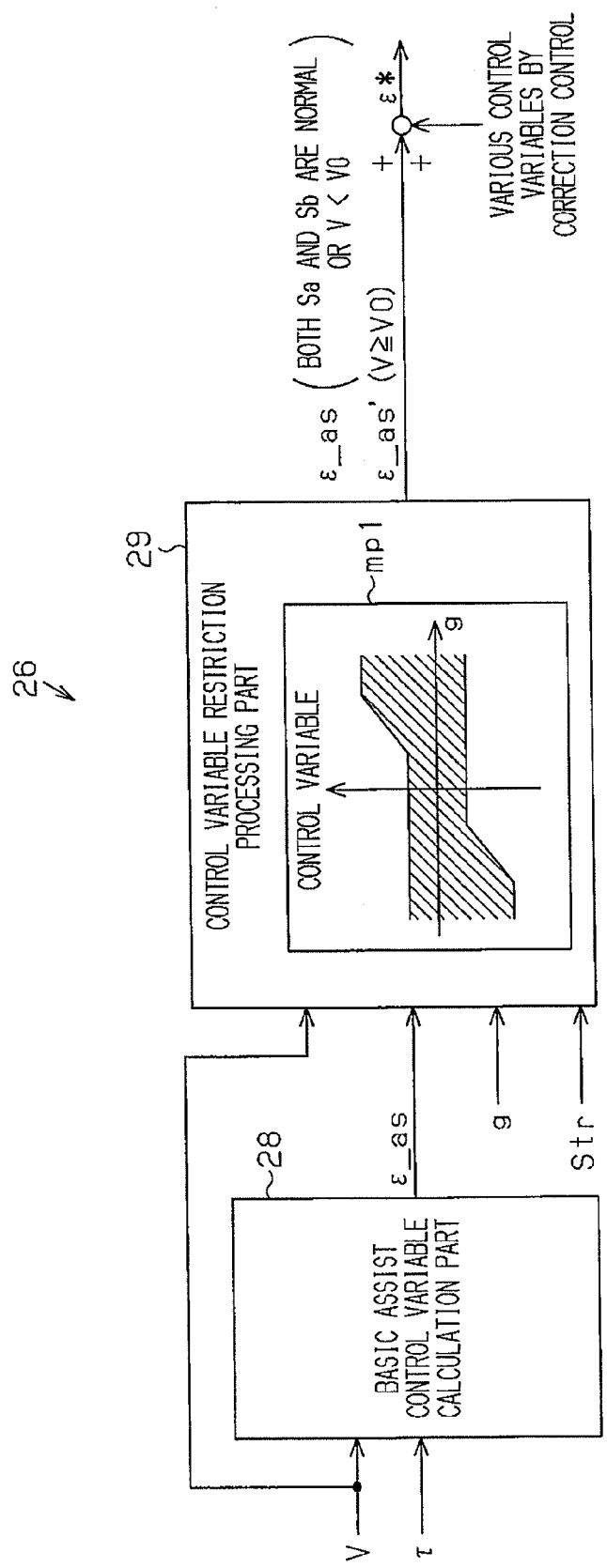
FIG. 3 is a block diagram showing a process to restrict a basic assist control variable according to a first embodiment of the present invention.

As shown in FIG. 3, the control variable restriction processing part 29 receives, in addition to the basic assist control variable ε_as, the vehicle speed V detected by the vehicle speed sensor 15, the lateral acceleration g detected by the lateral acceleration sensor 20 and the abnormality detection signal Str outputted from the steering torque calculation part 25. When only one of the sensor signals Sa and Sb is detected as abnormal, the control variable restriction processing part 29 executes an assist restriction process for setting an upper limit value and a lower limit value of the basic assist control variable $\epsilon\_as$. The control variable restriction processing part 29 also determines whether or not a process to restrict the basic assist control variable c as based on the vehicle speed V is necessary. More specifically, when the vehicle speed V is higher than or equal to a predetermined speed V0, the control variable restriction processing part 29 executes a process to restrict the basic assist control variable $\epsilon\_as$. In contrast, when the vehicle speed V is less than the predetermined speed V0, the control variable restriction processing part 29 does not execute a process to restrict the basic assist control variable $\epsilon\_as$.

The control variable restriction processing part 29 executes an assist restriction process corresponding to the lateral acceleration g. More specifically, the control variable restriction processing part 29 executes a process to restrict the basic assist control variable $\epsilon\_as$ by using a 'lateral acceleration g—assist control variable restriction value' map mp1 established in advance. The map mp1 is established with the lateral acceleration g as the lateral axis and the basic assist control variable as the vertical axis, wherein the basic assist control variable $\epsilon\_as$ is limited to a predetermined range.

The map mp1 is set so that the basic assist control variable $\epsilon\_as$ becomes larger as an absolute value of the lateral acceleration g increases. That is, an upper value of the basic assist control variable $\epsilon\_as$ is set to increase in the positive direction when the lateral acceleration g is a positive value, whereas a lower limit value of the basic assist control variable $\epsilon\_as$ is set to increase in the negative direction when the lateral acceleration g is a negative value. Note that an upper limit value and a lower limit value of the basis assist control variable $\epsilon\_as$ are set to have a fixed value in the vicinity of a neutral position in which the lateral acceleration g is close to 0.

The control variable restriction processing part 29 determines the basic assist control variable $\epsilon\_as$ limited to a predetermined range by corresponding to the lateral acceleration g, as a basic assist control variable $\epsilon\_as'$ obtained after the restriction process. The assist control part 26 further calculates the assist control variable $\epsilon^*$ by adding various kinds of control variables, each of which is calculated by a compensation control such as system stabilization control and disturbance suppression control, to the basic assist control variable $\epsilon\_as'$ obtained after a restriction process. The assist control part 26 calculates the current command value I* based on the assist control variable $\epsilon^*$ and outputs it to the motor control signal output part 24. Then, the motor control signal output part 24 generates a motor control signal by executing a current feedback control for causing the current command value I* to follow the actual current value I, and the drive circuit 22 supplies drive power based on the motor control signal to the motor 12.

The ECU 11 executes an assist suspension control for fail-safe in the event of no normal sensor signal detected in the sensor signals Sa and Sb generated by the plural systems and outputted from the torque sensor 14. That is, when the steering torque calculation part 25 detects both of the sensor signals Sa and Sb as abnormal and determines that the torque sensor 14 is faulty after passing of a predetermined period of time, the ECU 11 executes an assist suspension control. Upon execution of the assist suspension control, the ECU 11 promptly suspends an assist control by gradually decreasing an assist force applied to the steering system.

Next, a control flow of the assist control is explained with reference to FIG. 4. The control flow is executed repeatedly by the CPU 21 in a predetermined sampling period.

Figure 4:
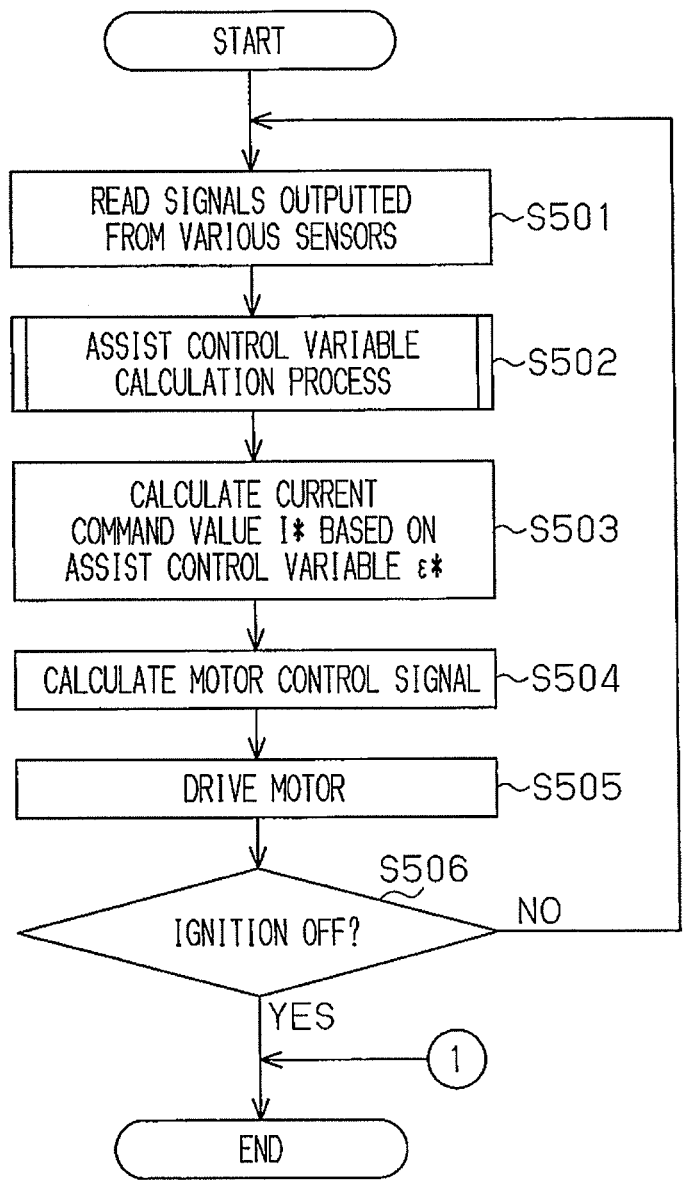
FIG. 4 is a flowchart for explaining an assist control.

As shown in FIG. 4, the CPU 21 firstly reads signals outputted from various kinds of sensors such as the torque sensor 14, the vehicle speed sensor 15, the steering sensor 16 and the lateral acceleration sensor 20 (step S501). Next, the CPU 21 executes an assist control variable calculation process based on signals outputted from the various kinds of sensors (step S502). Then, the CPU 21 calculates the current command value I* based on the assist control variable $\epsilon^*$ calculated in the assist control variable calculation process (step S503).

Next, the CPU 21 calculates a motor control signal by executing a current feedback control with the use of the current command value I* and the actual current value I (step S504). The CPU 21 outputs the motor control signal to the drive circuit 22 in order to drive the motor 12 (step S505). The CPU 21 determines whether or not to finish the control flow based on a state of ON/OFF of the ignition switch (step S506). When the ignition switch is turned on (step S506: NO), the CPU 21 does not finish the control flow and returns to the step S501 to execute the control flow. When the ignition switch is turned off (step S506: YES), the CPU 21 finishes the control flow.

Next, a control flow of the assist continuation control is explained with reference to FIG. 5.

Figure 5:
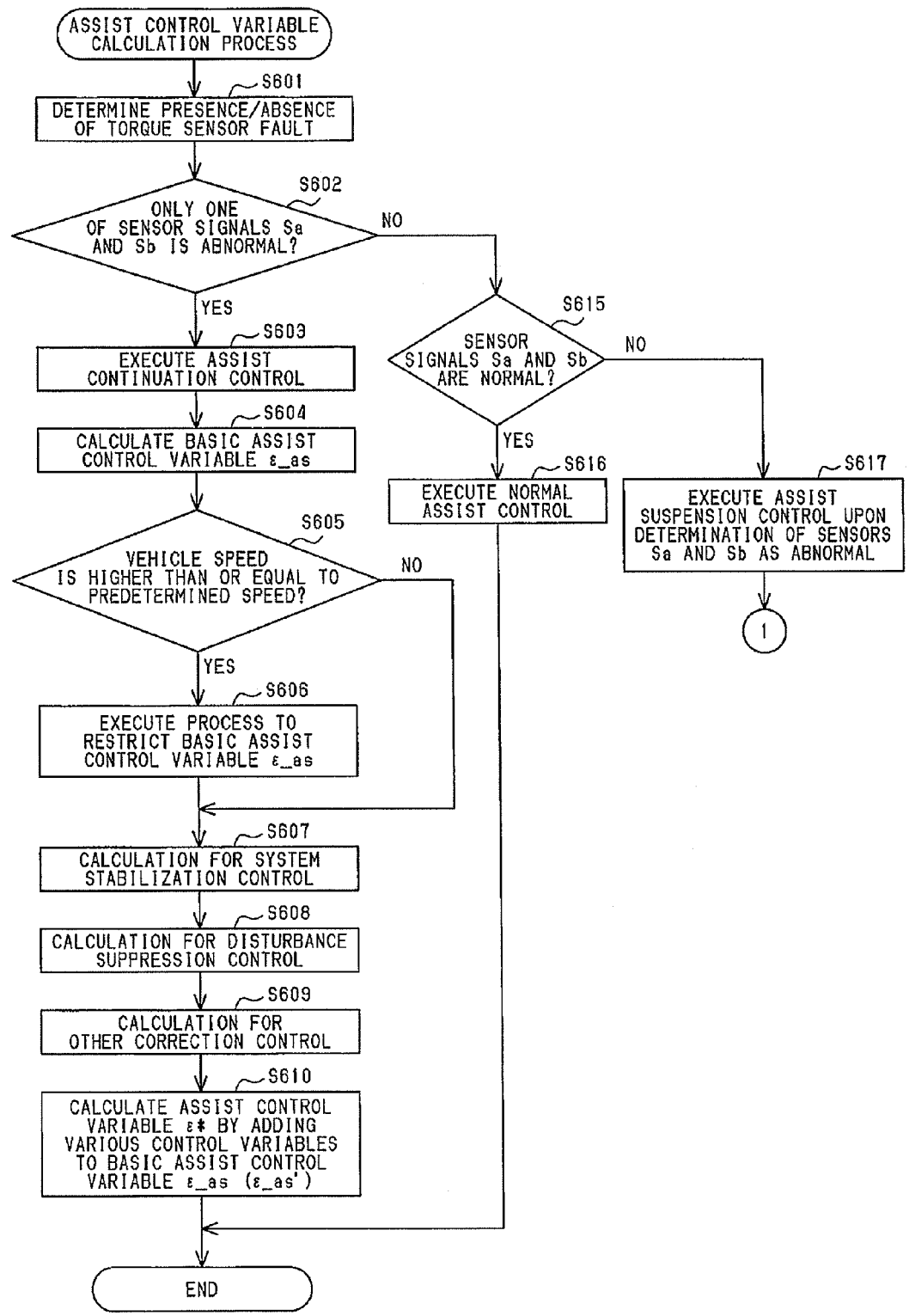
FIG. 5 is a flowchart for explaining process calculation of an assist control variable.

As shown in FIG. 5, the CPU 21 firstly determines the presence and absence of a fault in the torque sensor 14 (step S601). Next, the CPU 21 determines whether or not only one of the sensor signals Sa and Sb outputted from the torque sensor 14 is abnormal (step 602). If only one of the sensor signals Sa and Sb is abnormal (step 602: YES), the CPU 21 executes an assist continuation control (step 603). Then, the CPU 21 calculates the basic assist control variable $\epsilon\_as$ by using an assist map that is based on the vehicle speed V and the steering torque τ (step 604).

The CPU 21 sequentially determines whether or not the vehicle speed V is higher than or equal to a predetermined speed (step 605). If the vehicle speed V is higher than or equal to a predetermined speed (step 605: YES), the CPU 21 executes a process to restrict the basic assist control variable $\epsilon\_as$ (step 606). The CPU 21 executes a calculation for system stabilization control (step 607), a calculation for disturbance suppression control (step 608) and a calculation for other correction control (step 609) sequentially. Then, the CPU 21 calculates the assist control variable $\epsilon^*$ by adding various kinds of control variables to the basic assist control variable $\epsilon\_as'$ obtained after the restriction process (step 610). In contrast, if the vehicle speed V is less than a predetermined speed (step 605: NO), the CPU 21 shifts the flow to step 607 without execution of a process to restrict the basic assist control variable $\epsilon\_as$.

If determination is not such that only one of the sensor signals Sa and Sb is abnormal (step 602: NO), the CPU 21 determines whether or not both of the sensor signals Sa and Sb are normal (step 615). If both of the sensor signals Sa and Sb are normal (step 615: YES), the CPU 21 executes a normal assist control (step 616). Then, the CPU 21 finishes the assist control variable calculation process. In contrast, when both of the sensor signals Sa and Sb are not normal (step 615: NO), the CPU 21 determines that the sensor signals Sa and Sb are both abnormal and executes an assist suspension control (step 617). The CPU 21 executes an assist suspension control and finishes the control flow of the assist control.

As stated above, the following effects can be obtained according to the first embodiment.

1) The control variable restriction processing part 29 executes an assist restriction process for setting an upper limit value and a lower limit value of the basic assist control variable ∈_as. In this configuration, the control variable restriction processing part 29 executes an assist restriction control when only one of the sensor signals Sa and Sb generated by the plural systems and outputted from the torque sensor 14 is normal, or when only one of the sensor signals Sa and Sb is detected as abnormal. Therefore, even if there is no normal sensor signal detected due to abnormality of the remaining normal sensor, unintentional application of an assist force to the steering system can be suppressed effectively because the magnitude of an assist force applied to the steering system is limited to a predetermined range.

2) In general, a reaction torque inputted from a road surface to the steering system is correlated with the lateral acceleration g acting on a vehicle. More specifically, a reaction torque becomes larger as the lateral acceleration g acting on a vehicle increases. Therefore, a driver requires a larger steering torque in steering as the lateral acceleration g increases. By taking this aspect into consideration, the control variable restriction processing part 29 executes an assist restriction process according to the lateral acceleration g. In this configuration, an assist control process is executed to increase an assist force applied to the steering system since an external force applied to the steering system is large when the lateral acceleration g is large. In contrast, an assist control process is executed to reduce an assist force applied to the steering system since an external force applied to the steering system is small when the lateral acceleration g is small.

3) The control variable restriction processing part 29 executes a process to restrict the basic assist control variable ∈_as by using the 'lateral acceleration g—assist control variable restriction value' map mp1 established in advance. In this configuration, an upper limit value and a lower limit value of the basic assist control variable can be set easily according to design specifications.

4) The control variable restriction processing part 29 also determines whether or not a process to restrict the basic assist control variable ∈_as is necessary based on the vehicle speed V. When the vehicle speed V is higher than or equal to the predetermined speed V0, the control variable restriction processing part 29 executes a process to restrict the basic assist control variable ∈_as. In contrast, when the vehicle speed V is less than the predetermined speed V0, the control variable restriction processing part 29 does not execute a process to restrict the basic assist control variable ∈_as. In general, since a sufficiently large assist force is required when the vehicle speed V is low, the need for restricting an assist control variable is low. In this regard, according to this configuration, since the assist restriction process is executed only when the vehicle speed V is higher than or equal to a predetermined speed, an assist force can be applied to the steering system continuously only in a vehicle speed range in which an assist force is required.

5) The ECU 11 executes an assist suspension control for fail-safe in the event of no normal signal detected in the sensor signals Sa and Sb generated by the plural systems and outputted from the torque sensor 14. In this configuration, when there is no normal sensor signal detected, the ECU 11 eventually suspends an assist control while gradually decreasing an assist force. Therefore, a sudden change of an assist force due to an abnormal sensor signal outputted from the torque sensor 14 can be prevented. As a result, steering operation by a driver can be realized without hindrance.

Second Embodiment

Explained below with reference to FIG. 6 is a second embodiment in which a concrete example of the electronic power steering apparatus according to the present invention is presented. Note that detailed explanation of parts similar to the first embodiment is omitted in the second embodiment.

As shown in FIG. 6, an assist control part 126 includes the basic assist control variable calculation part 28 and a control variable restriction processing part 129. The control variable restriction processing part 129 receives, in addition to the basic assist control variable ∈_as, the vehicle speed V detected by the vehicle speed sensor 15, the steering angle θs detected by the steering sensor 16, and the abnormality detection signal Str outputted from the steering torque calculation part 25. The control variable restriction processing part 129 executes an assist restriction process corresponding to the steering angle θs when only one of the sensor signals Sa and Sb is detected as abnormal. The control variable restriction processing part 129 executes a process to restrict the basic assist control variable ∈_as by using 'steering angle θs—assist control variable restriction value' maps mp2-1 to mp 2-3 established in advance. The maps mp2-1 to mp2-3 are established with the steering angle θs as the lateral axis and the basic assist control variable as the vertical axis, wherein the basic assist control variable ∈_as is limited to a predetermined range. The control variable restriction processing part 129 is provided with the three 'steering angle θs—assist control variable restriction value' maps mp2-1, mp2-2 and mp 2-3. The control variable restriction processing part 129 selects one of the three maps according to the vehicle speed V and executes an assist restriction process based on the selected map. Out of the three maps, the first map mp2-1 is a 'steering angle θs—assist control variable restriction value' map that is selected when the vehicle speed V is lower than or equal to a first speed V1. The second map mp2-2 is a 'steering angle θs—assist control variable restriction value' map that is selected when the vehicle speed V corresponds to a second speed V2 that is higher than the first speed V1. The third map mp2-3 is a 'steering angle θs—assist control variable restriction value' map that is selected when the vehicle speed V is higher than or equal to a third speed V3 that is higher than the second speed V2. In this case, the first speed V1, the second speed V2 and the third speed V3 are set to 1 km/hr, 5 km/hr and 16 km/hr respectively.

The maps mp2-1 to mp 2-3 are set so that the basic assist control variable ∈_as becomes larger as an absolute value of the steering angle θs increases. That is, an upper value of the basic assist control variable ∈_as is set to increase in the positive direction when the steering angle θs is a positive value, whereas a lower value of the basic assist control variable ∈_as is set to increase in the negative direction when the steering angle θs is a negative value. Note that an upper value and a lower value of the basic assist control variable ∈_as is set to have a fixed value in the vicinity of a neutral position in which the steering angle θs is close to 0.

In addition, when the vehicle speed V is higher than the first speed V1 but lower than the second speed V2, the control variable restriction processing part 129 executes an assist restriction process based on an upper limit value and a lower limit value of the basic assist control variable obtained by interpolation of the first map mp2-1 and the second map mp2-2. When the vehicle speed V is higher than the second speed V2 but lower than the third speed V3, the control variable restriction processing part 129 executes an assist control process based on an upper limit value and a lower limit value of the basic assist control variable obtained by interpolation of the second map mp2-2 and the third map mp2-3.

As stated above, the following effects can be obtained according to the second embodiment.

6) In general, a reaction torque inputted from a road surface to the steering system is correlated with the steering angle θs of the steering wheel 2. More specifically, a reaction torque becomes larger as the steering angle θs increases. Therefore, a driver requires a larger steering torque in steering as the steering angle θs increases. By taking this aspect into configuration, the control variable restriction processing part 129 executes an assist restriction control corresponding to the steering angle θs. Therefore, an assist control process is executed to increase an assist force applied to the steering system since an external force transmitted to the steering system is large when the steering angle θs is large. An assist control process is executed to reduce an assist force applied to the steering system since an external force transmitted to the steering system is small when the steering angle θs is small.

7) The control variable restriction processing part 129 selects one of the three maps mp2-1 to mp2-3 according to the vehicle speed V and executes an assist restriction process based on the selected map. In general, since a sufficiently large assist force is required when the vehicle speed V is low, the need for restricting an assist control variable is low. Also, it is preferable to apply an assist force by imposing higher restriction on an assist control variable when the vehicle speed V is high than when it is low. In this regards, the control variable restriction processing part 129 executes an assist restriction process based on any of the maps mp2-1 to mp2-3 selected according to the vehicle speed V. Therefore, an assist force of an appropriate magnitude relative to a vehicle speed can be applied to the steering system while restricting an assist control variable.

8) When the vehicle speed V is higher than the first speed V1 but lower than the second speed V2, the control variable restriction processing part 129 executes an assist restriction process based on an upper limit value and a lower limit value of the assist control variable obtained by interpolation of the first map mp2-1 and the second map mp2-2. When the vehicle speed V is higher than the second speed V2 but lower than the third speed V3, the control variable restriction processing part 129 executes an assist restriction process based on an upper limit value and a lower limit value of the assist control variable obtained by interpolation of the second map mp2-2 and the third map mp2-3. In this configuration, unintentional application of an assist force to the steering system can be suppressed while appropriately restricting an assist control variable appropriately throughout an entire vehicle speed range.

Note that each of the above embodiments may also be modified as follows.

Although the one 'lateral direction acceleration g—assist control variable restriction value' map mp1 or the three 'steering angle θs—assist control variable restriction value' maps mp2-1 to mp2-3 are used in the process to restrict the basic assist control variable as in each of the above embodiments, the process to restrict the basic assist control variable ϵ_as may also be executed by using two or more than four maps. The first speed V1, the second speed V2 and the third speed V3 corresponding to the maps mp2-1 to mp2-3 may also be modified appropriately according to design specifications.

In each of the above embodiments, the process to restrict the basic assist control variable ϵ_as may also be executed by providing the 'lateral direction acceleration g—assist control variable restriction value' map or one of the 'steering angle θs—assist control variable restriction value' maps and applying a gain corresponding to a vehicle speed and the like to the map. The 'steering angle θs—assist control variable restriction value' maps may also be three-dimensional.

In each of the above embodiments, the present invention may also be adapted to an electronic power steering apparatus having, in place of the torque sensor 14 for outputting the sensor signals Sa and Sb generated by the two systems, a torque sensor for outputting sensor signals generated by three or more systems or a torque sensor for outputting a sensor signal generated by one system.

In each of the above embodiments, the process to restrict the basic assist control variable ϵ_as may also be executed in making a normal assist control other than an assist continuation control.

In each of the above embodiments, a magnetic transducer element to constitute the sensor elements 14a and 14b and the sensor element 19 may be any other element without being limited to a Hall IC.

In each of the above embodiments, the present invention may also be adapted to detect abnormality of components other than the magnetic torque sensor.

Although the basic assist control variable is used as a parameter to indicate an assist force applied to the steering system in each of the above embodiments, the current command value I* of the motor 12 may also be used.

Although the lateral acceleration g and the steering angle θs are used for execution of the process to restrict the basic assist control variable ϵ_as in each of the above embodiments, state parameters such as the steering speed ωs and yaw rate detected by a yaw rate sensor, not shown, may also be used. These state parameters may also be used in combination. Note that the steering speed ωs may also be calculated by differential processing of the steering angel θs with the use of the differentiator S, as shown in FIG. 2.

Although a DC motor with a brush is used for the motor 12 in each of the above embodiments, a brushless motor and/or induction motor may also be used. In particular, in the case of changing a motor torque according to the steering speed cos, it is preferable to use a rotation angle sensor made of a brushless motor for detection of the steering speed cos.

In each of the above embodiments, the present invention may also be adapted to an electronic power steering apparatus of a pinion type and/or rack assist type without being limited to an electronic power steering apparatus of a column type.

The invention claimed is:

1. An electronic power steering apparatus comprising:
    a steering force assist device having a motor as a drive source, wherein the steering force assist device applies an assist force to a steering system of a vehicle;
    a torque sensor for outputting sensor signals generated by a plurality of systems based on torsion of a torsion bar provided in a steering shaft;
    a vehicle speed sensor for detecting a vehicle speed;
    a torque calculation section for detecting a steering torque based on the sensor signals outputted from the torque sensor; and
    a control section for controlling the steering force assist device, for calculating an assist control variable based on the steering torque and the vehicle speed, and for executing an assist control for applying an assist force based on the assist control variable to the steering system; wherein
    upon detection that only one of the sensor signals generated by the plurality of systems is normal, the control section executes an assist restriction process for setting an upper limit value and a lower limit value of the assist control variable based on a map according to at least any one of the lateral acceleration, steering angle, steering speed and yaw rate, the control section has a first map selected when the vehicle speed is lower than or equal to a first speed and a second selected when the vehicle speed is a second speed being higher than the speed, and the control section executes, when the vehicle speed is higher than the first speed but lower than the second speed, the assist restriction process based on an upper limit value and a lower limit value of the assist control variable obtained by interpolation of the first map and the second map.

2. The electronic power steering apparatus according to claim 1, wherein the control section executes the assist restriction process when the vehicle speed is higher than or equal to a predetermined speed.

3. The electronic power steering apparatus according to claim 1, wherein:

the control section further has a third map selected when the vehicle speed is higher than or equal to a third speed being higher than the second speed; and the control section executes, when the vehicle speed is higher than the second speed but lower than the third speed, the assist restriction process based on an upper limit value and a lower limit value of the assist control variable obtained by interpolation of the second map and the third map.

4. The electronic power steering apparatus according to claim 1, wherein upon detection of no normal sensor signal in the sensor signals generated by the plurality of systems, the control section suspends the assist control by gradually decreasing the assist force.

* * * * *